Nov. 23, 1965   P. D. SCHWARZ   3,220,009
PARKING AREA CASHIERING SYSTEM
Filed April 9, 1962   4 Sheets-Sheet 1

INVENTOR.
P.D. SCHWARZ
BY
HIS ATTORNEY

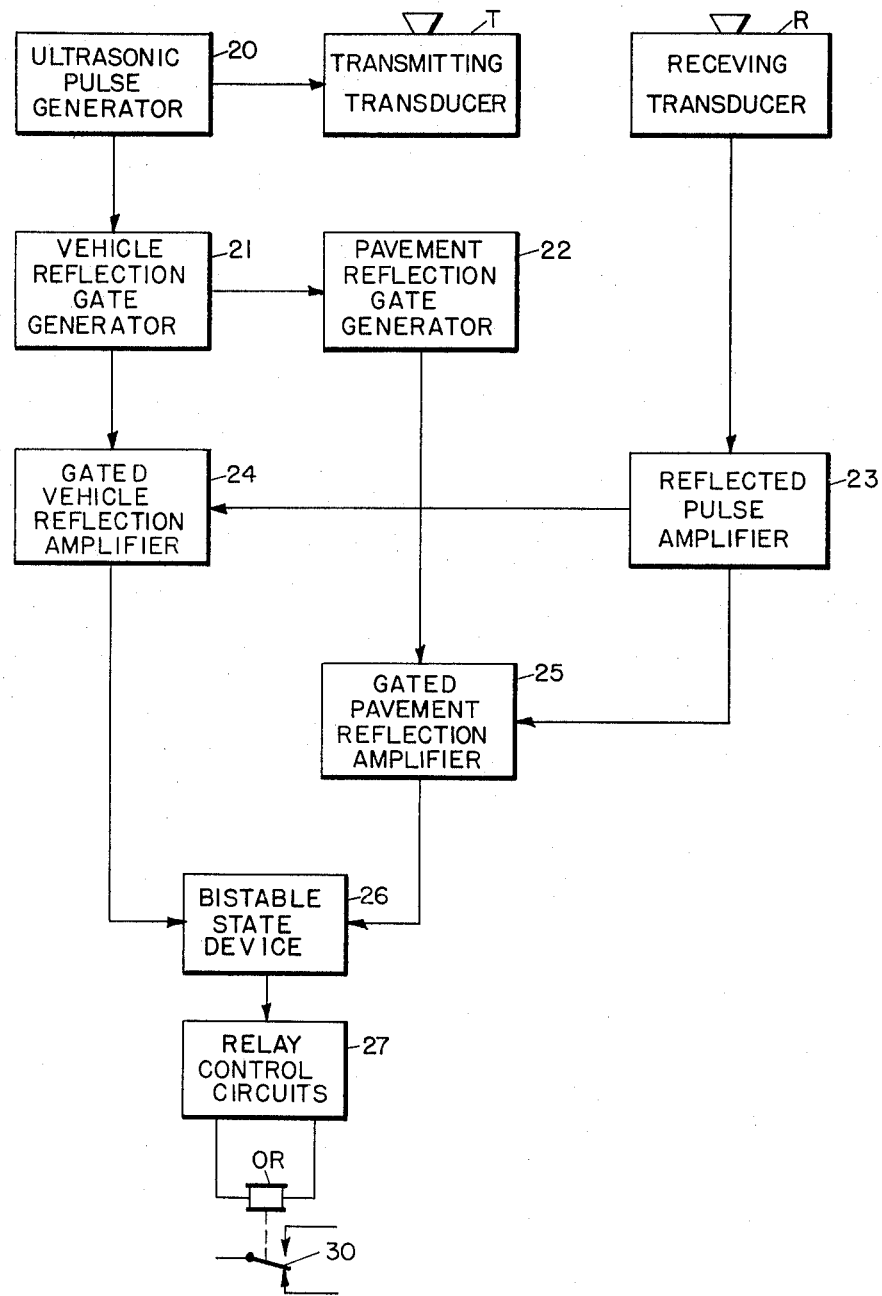

INVENTOR.
P. D. SCHWARZ
BY
HIS ATTORNEY

INVENTOR.
P.D. SCHWARZ
BY
HIS ATTORNEY

United States Patent Office 3,220,009
Patented Nov. 23, 1965

3,220,009
PARKING AREA CASHIERING SYSTEM
Peter D. Schwarz, Rochester, N.Y., assignor to General
Signal Corporation, a corporation of New York
Filed Apr. 9, 1962, Ser. No. 186,162
16 Claims. (Cl. 346—33)

This invention relates to a parking area cashiering system and more particularly relates to a cashiering system of the type wherein a parking fee is charged which is commensurate with the time elapsed since the vehicle entered the parking area.

A number of advantages are inherent in the employment of an attendant, such as a cashier, in a parking area. Such a person is available for a variety of tasks in the event of a vehicle breakdown or other emergency. His presence alleviates the necessity of vehicle operators carrying the exact fare and he acts as a deterrent to vehicle operators who might otherwise attempt to avoid payment. Possibly the most important advantage of a manual cashiering system is the ease with which the more equitable fee based on elapsed time in the parking area may be computed and collected without the employment of complex electronic decoding equipment.

Heretofore, a major problem occurring with this type of cashiering system concerned the susceptibility of the cashier to engage in dishonest practices such as allowing acquaintances to park their vehicles without payment of a fee or checking a vehicle out early and retaining the difference between a parking fee based on the actual time in the parking area and the early checkout time as reported.

In order to retain the advantages of a manual cashiering system yet avoid the aforementioned disadvantages, the present invention proposes that a cashier be suitably located at the exit of a parking area in a booth or other type of collection station. Detectors responsive only to vehicles are mounted adjacent the collection station to condition a time recording means to be operative to print the exit time on a parking ticket or other suitable indicia of vehicle presence in the parking area only when a vehicle enters the detection zone adjacent said cashier's booth. Means are provided to give a warning to the cashier should the operator of a vehicle attempt to leave the detection area before the exit time is recorded on the parking ticket. Moreover, the circuit arrangement is such that the cashier is permitted to actuate the exit time recording means only one time after which another vehicle must be detected adjacent the cashier's collection station in order to condition the time recording means for reoperation.

The inventive concepts are illustrated in a variety of structural forms. A first form of cashiering system, in which payment is solely on a cash basis, is disclosed wherein a time recorder is conditioned for stamping the exit time on a parking ticket once only when the presence of a leaving vehicle is detected adjacent the collection booth. A counting means is provided for recording the number of vehicles detected and a second counting means provided for recording the number of exit time recorder operations performed. Should there be a discrepancy between the totals appearing on the counting means, an explanation would be required by the cashier.

A second form of cashiering system has utility in a parking area in which certain of the customers pay on a cash basis and others pay periodically and suitable billing means, such as an Addressograph recorder and charge plate, are employed to record the parking charges. With this circuit arrangement, a periodically paying customer in an exiting vehicle gives the cashier the parking ticket and the Addressograph plate. Operation of the Addressograph recorder to print the Addressograph plate imprint on the ticket prevents operation of the exit time recorder used with cash customers even though vehicle presence is detected adjacent the collection booth. Circuit operation for cash customers is the same as the first form of this invention. Suitable counters and alarm devices are provided to respectively monitor the cashiering operation and to warn the cashier if the operator of a vehicle leaves the collection both area prior to computation of his parking fee.

A third circuit arrangement is disclosed which provides for a cashier with an exit time recorder for the periodic accounts and a second exit time recorder to be utilized with cash customers. In this instance, the exit time recorder for cash customers is conditioned to print the exit time once on the parking ticket in accordance with detection of a vehicle adjacent the collection booth. The exit time recorder for periodic accounts, is conditioned by the customer who inserts a coded card key into a card lock unit. When the periodic paying customer's time recorder is conditioned, a signal indication is given the driver who proceeds into the detection zone adjacent the cashier's station to have the parking ticket validated. Counting and warning means are arranged to respectively record the various transactions and to alert the cashier should the operator of a vehicle attempt to leave the detection area prior to validation of his parking ticket.

In view of the aforementioned, one object of this invention is to provide a cashier surveillance and exit monitoring system for a parking area.

A second object of this invention is to provide a cashier surveillance system of the type described wherein the cashiering apparatus (e.g. exit time recorder, etc.) at a cashier's collection booth may be actuated only when a vehicle is detected adjacent the cashier's collection booth.

Another object of this invention is to provide a cashier surveillance system of the type described for a parking area wherein actuation of the cashier's apparatus is permissible only one time when a vehicle is detected adjacent the cashier's collection booth.

A further object of the present invention is to provide a cashier surveillance and exit monitoring system for a parking area having means for providing a suitable warning should a vehicle attempt to leave the cashier's collection booth prior to operation of the cashier's apparatus.

A still further object of the present invention is to provide a system of the type described for a parking area wherein counting means are provided for comparing the number of operations of the cashiering apparatus with the number of vehicles detected.

Other objects, purposes, and characteristic features of this invention will be in part obvious from the accompanying drawings and in part pointed out as the description of the invention progresses.

FIG. 3 is a block diagram of one type of ultrasonic vehicle detector apparatus suitable for utilization with the present embodiment of this invention;

For the purpose of simplifying the illustration and facilitating the explanation, the various parts and circuits constituting this embodiment of the present invention have been shown diagrammatically and certain conventional elements have been shown in block form. The drawings have been made more with the purpose of making it easy to understand the principles and mode of operation, than with the idea of illustrating the specific construction and arrangement of parts that would be employed in practice. The symbols (+) and (−) are employed to indicate the positive and negative terminals of suitable batteries or other sources of direct current; and the circuit in which the symbols are used always have current flowing in the same direction.

Figure 1:
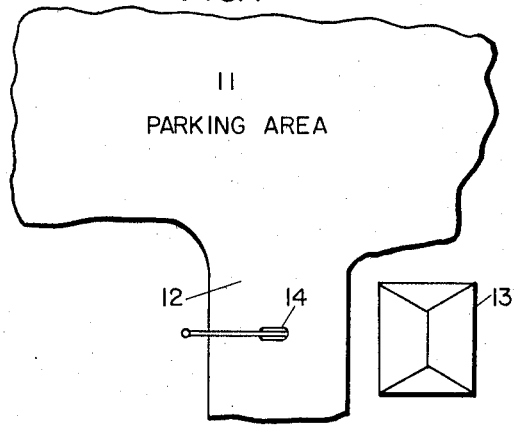
FIG. 1 illustrates one form of parking area exit configuration with which the present invention may be utilized.

Referring to FIG. 1 of the drawings, the numeral 11 designates generally that area which will be regarded as an automobile parking area. Admission to the parking area may be gained by any suitable means of entry. However, egress from the parking area occurs only through the exit lane 12. The current embodiment of this invention presupposes the employment of ticket dispensing means at the entrance to the parking area for issuing a parking ticket with the entrance time stamped thereon. As a matter of convenience, the ticket may be formed of pasteboard or the like, and will be so considered herein, although it will be understood that the invention is not limited thereto. As the ticket dispensing mechanism forms no part of the present invention, it is not shown. However, a number of circuit organizations for issuing such a time stamped ticket from a dispenser and for controlling an entrance gate to a parking area to its non-restricted position in accordance with the taking of the ticket are well known to those familiar with the art.

When a vehicle leaves the parking area, a parking fee computed in accordance with the time elapsed since the vehicle entered the area, is charged to the account of the regular customer or a cash payment is extracted, for example, at the cashier's collection booth 13 shown in FIG. 1.

When the exiting vehicle passes beneath the ultrasonic vehicle detector designated broadly at 14 (FIG. 2), the cashier's apparatus becomes conditioned to be operated and the exit time is then stamped upon the parking ticket and the proper fee collected or charged by the cashier. As previously mentioned, should a car attempt to leave the cashier's booth prior to actuation of the exit time recording mechanism, for example, a suitable warning will be given the cashier and he may take whatever measures are necessary to apprehend the operator of the leaving vehicle.

In accordance with the present invention, the vehicle detector 14 is preferably of the ultrasonic type such as shown for example in the prior application of Auer, Serial No. 820,325, filed June 15, 1959 (now U.S. Patent No. 3,045,909, issued July 24, 1962) which has been briefly illustrated in FIG. 3 by block diagram to schematically indicate its broad function. This prior Auer application, is assigned to the assignee of the present invention.

More particularly, the vehicle detection apparatus illustrated in FIG. 3 of the accompanying drawings includes generating circuitry 20 effective to produce a series of pulses of ultrasonic frequency which are transmitted by transducer T, in the form of a beamed wave directed, for the purposes of this disclosure, at the floor of the exit lane 12 (see FIG. 1) in which traffic is being detected. These transmitted pulses are then reflected back to a receiving transducer R from either the floor of the exit lane 12 or from an intervening vehicle, dependent upon whether or not a vehicle is in fact exiting past the collection booth 13. The detecting apparatus furthermore includes gate generator circuitry 21 and 22 utilized respectively with gated amplifiers 24 and 25, to permit discrimination between pulses being reflected from the roadway and those being reflected from an exiting vehicle. More particularly, the received reflection pulses are amplified by circuitry 23 and applied to the gated amplifiers 24 and 25 to selectively operate a bistable device 26 to one or the other of its operational states dependent upon whether or not the received pulses are being reflected from an exiting vehicle or from the roadway. At the output of the bistable device 26 is suitable relay control circuitry 27 effective to cause occupany relay OR to be either picked up or dropped away dependent respectively upon whether or not a vehicle is present in the detection zone adjacent collection booth 13.

It is to be understood that in order for the present invention to operate effectively, it is essential that the cashier's apparatus be renered operable in response to the detection of a vehicle regardless of whether such a vehicle is a convertible or canvas covered truck or open truck with cargo. The detection system of the Auer organization is capable of performing these functions.

Figure 4:
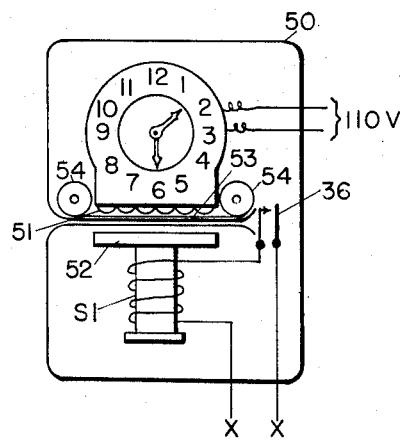
FIG. 4 is a diagrammatic illustration of one form of exit time recording mechanism that may be employed as part of the cashiering apparatus in accordance with the present invention.

FIG. 4 broadly illustrates the primary elements of a cashier's time recorder of the type which may be suitably employed with the present invention. The time recorder consists of an electric clock broadly designated at 50 for controlling type wheels 51 in accordance with the passage of time to print the hour, minute, month and day directly onto a parking ticket. A solenoid S1 is shown as having a time stamp printing anvil 52 affixed to the solenoid core and movable in accordance with the energization of the solenoid S1. A typewriter ribbon 53 rotatably mounted on spindles 54 is also shown.

Operation of the exit time recorder is as follows: When the cashier inserts a parking ticket into the time recorder, solenoid S1 is energized when the pressure of the ticket closes microswitch 36 providing an energizing circuit for the solenoid S1 as represented by the symbol pair XX in FIG. 4. Energization of the solenoid S1 causes the printing anvil 52 to be moved upwardly forcing the parking ticket against the printing ribbon 53 and the printing wheels 51 which results in the exit time being printed on the parking ticket. A variety of other printed information can be made available. Usually such time recorders print the hour, minute, month and day on the parking ticket and in some instances, an identifying symbol indicating the clock which has been operated can be made available. As the specific details of the time recorder forms no part of the present invention, it is shown broadly and a number of commercial time recorders are available. For example, a time recorder which may be utilized with the present invention is shown in Bulletin No. CC2, published by Lathem Time Recorder Company, 76 Third Street NW., Atlanta, Georgia.

In accordance with the illustrated embodiment of the present invention, suitable counting apparatus is provided at the cashiering location for keeping track of both the number of vehicles that exit from the parking area 11 and the number of time recorder operations, so that management may readily detect whether or not all vehicles have paid their parking charges. In the present disclosure, each of the counters employed is assumed to be of conventional construction including an add coil which is effective, when energized and then deenergized, to cause the counter to advance the number registered on its totalizer display means by one count.

Figure 2:
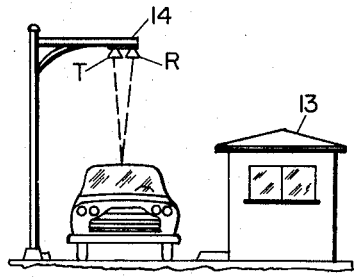
FIG. 2 illustrates a mounting arrangement utilized when ultrasonic vehicle detectors are employed with the present invention.
Figure 5:
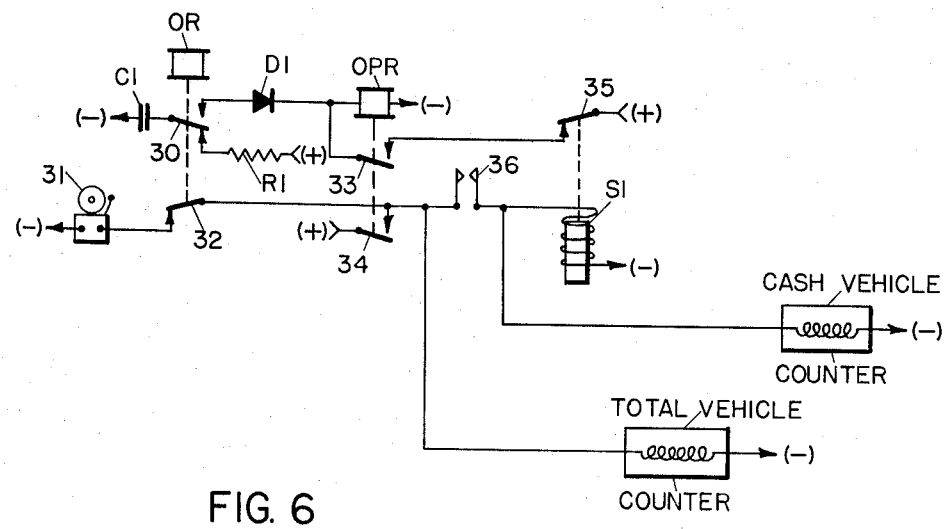
FIG. 5 illustrates the circuit arrangement of one form of this embodiment of the present invention which may be utilized when the parking area fees are payable with cash.

More specifically, referring to FIG. 5, let us assume that the occupancy relay OR is energized in response to the presence of a leaving vehicle beneath the detector 14 (see FIGS. 1 and 2). Energization of the relay OR will close its front contact 30 thereby causing the electrical charge which was developed across the capacitor C1 by means of the energizing source applied through R1 and back contact 30, to discharge through the windings of the occupancy repeater relay OPR, via the diode D1. Energization of the relay OPR closes its front contact 33 thereby providing a stick circuit for the relay OPR. The diode D1 prevents the positive source of potential, being applied to the relay OPR via the normally closed contact 35 operated by the time recorder solenoid S1, from affecting the capacitor C1. Closure of front contact 34 of the energized relay OPR energizes the add coil of the total vehicle counter.

Insertion of the parking ticket for this leaving vehicle into the time recorder by the cashier completes a circuit, by means of the ticket actuated switch 36, for energizing the solenoid S1. This circuit comprises (+), front contact 34 of relay OPR, the closed ticket switch 36, the windings of the solenoid S1 to (−). Furthermore, the closure of ticket switch 36 also energizes the add coil of the cash vehicle counter in FIG. 5.

Energization of the solenoid S1 actuates the time stamp anvil 52 (see FIG. 4) which stamps the exit time on the parking ticket as hereinbefore described and the fee is computated on the basis of the elapsed time in the parking area. Energization of the solenoid S1 opens contact 35 which removes the source of potential maintaining the occupancy repeater relay OPR energized, so that relay OPR then opens its front contact 34.

The opening of front contact 34 removes energy from the add coil of the total vehicle counter, thereby causing its totalizer display means to add a vehicle count in response to the detection of one vehicle leaving the parking area. The opening of front contact 34 also removes energy from the add coil of the cash vehicle counter and one cash vehicle is thereby registered on its totalizer display means in accordance with the stamping of the parking ticket by the cashier. These two counters shown in FIG. 5 thus provide a relatively simple means whereby management is kept informed concerning whether or not all vehicles pay their required parking charge, and, any discrepancy between the number of exiting vehicles and the number of parking tickets stamped must be explained by the cashier.

It is to be noted that the circuit arrangement is such that if a vehicle leaves the detection area prior to operation of the ticket printing switch 36, a suitable warning is given the cashier by means of an alarm such as the warning bell 31. As previously discussed, the occupancy relay OR is energized in response to the detection of a vehicle adjacent the cashier's booth. Under these circumstances, the energized relay OR maintains its back contact 32 in the open position whenever a vehicle is present. Therefore, whenever front contact 34 of relay OPR is closed in response to vehicle detection, a vehicle leaving the detection zone prior to actuation of the ticket printing switch 36 will cause a circuit to be completed for energizing the warning bell 31. This circuit includes (+), front contact 34 of relay OPR, back contact 32 of relay OR, the warning bell 31 and (−). However, as soon as front contact 34 of deenergized relay OPR opens in response to the opening of back contact 35 by the energized solenoid S1, the vehicle may leave the area adjacent the collection booth without operation of the warning bell 31.

In view of the above, it can be seen that once the presence of a vehicle is detected adjacent the cashier's booth, the time recorder is conditioned to print the exit time on the parking ticket one time. That is, after the contact 35 is actuated to interrupt the stick circuit for relay OPR, this relay cannot subsequently be picked up until occupancy relay OR is released, by the departure of the car, so as to recharge capacitor C1 over its back contact 30. Should the operator of a vehicle attempt to leave the parking area prior to completion of the printing operation, a warning bell 31 will notify the cashier. It should also be noted that a count is provided of the number of vehicles detected and a count is provided of the number of time clock options which took place in a given period. Any discrepancy between the two must be explained by the cashier.

Figure 6:
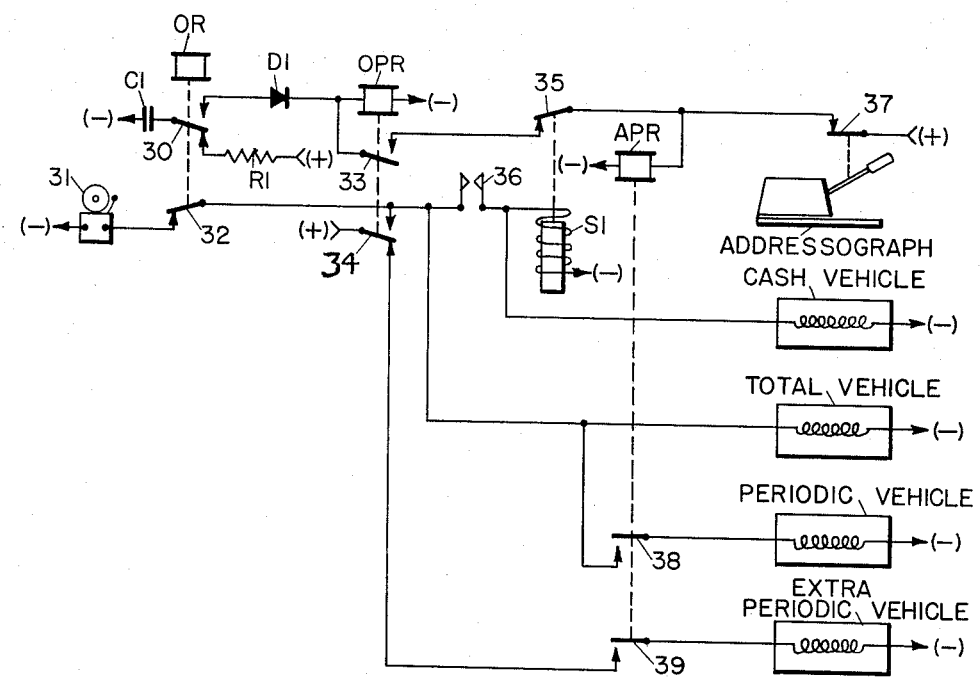
FIG. 6 illustrates the circuit arrangement of a second form of this embodiment of the present invention which may be utilized when the parking fees are payable with cash or charged to a periodic account.

Referring to FIG. 6, a second circuit arrangement is shown which has utility in a parking area wherein certain of the customers pay on a cash basis and other customers are charged for the use of the parking area over a fixed time period and billed at the end of the time period. A number of devices are available for maintaining such a charge account. An Addressograph data recorder is shown broadly in FIG. 6 merely by way of example. One such data recorder is illustrated in Bulletin AP-1759 published by the Addressograph-Multigraph Corporation, located at 1200 Babbitt Road, Cleveland 17, Ohio.

Operation of the circuit for cash customers is essentially that previously discussed. However, this second form of the invention presupposes the utilization of an identification plaque or plastic card to be used by regular customers having a charge account with the parking area management.

With this circuit arrangement, should a customer enter the vehicle detection zone adjacent the cashier's booth, the occupancy relay OR will become energized allowing the charge on the capacitor C1 to discharge through the diode D1 and the windings of the relay OPR. Energization of the relay OPR closes its front contacts 33 and 34. The closure of front contact 33 of relay OPR completes a stick circuit for that relay, said circuit including (+), contact 37 which is controlled by the illustrated Addressograph recorder as will be described, contact 35 which is actuated by solenoid S1, front contact 33 of relay OPR, the windings of relay OPR and (−).

The closure of front contact 34 of relay OPR places the circuit in condition for operation of the cash customer's time recorder one time. The closure of front contact 34 also energizes the add coil of the total vehicle counter.

If the customer is a cash customer, insertion of the parking ticket in the cashier's time recorder (see FIG. 4) will close the contacts of the ticket switch 36 completing a circuit for the energization of the solenoid S1. As previously discussed, the energized solenoid S1, while performing the exit time stamping operation, will open contact 35 thereby removing energy from the occupancy repeater relay OPR causing this relay to open its front contact 34 adding one vehicle to the count displayed by the total vehicle counter. Closure of the ticket printing switch 36 with the relay OPR in the energized condition, will cause a similar count to be subsequently added to the cash vehicle counter display means when front contact 34 of relay OPR drops away.

If the operator of the vehicle is a customer who is charged on a regular basis for his use of the parking area, the presence of his vehicle beneath the vehicle detector 14 adjacent the cashier's booth will cause energization of the relay OR and the relay OPR in the same manner as described for the cash customer. The circuitry is conditioned in the same way for either a cash or charge customer.

Energization of the relay OPR provides a circuit for energizing the add coil of the total vehicle counter by means of an obvious circuit including front contact 34 of relay OPR. The cashier inserts the customer's credit card into the Addressograph data recorder along with the parking ticket which was issued him on entering the parking area. The cashier closes the machine and presses the lever. The customer's identification and date of the transaction are imprinted on the parking ticket. Operation of the Addressograph data recorder furthermore opens contact 37 in the stick circuit for relay OPR and thereby deactivates the cashier's regular time recorder.

The deenergized relay OPR opens its front contact 34 thereby removing energy from the add coil of the total vehicle counter, thus adding one unit to the display means of the counter. The opening of front contact 34 also removes the energy placed on the add coil of the periodic vehicle counter over back contact 38 of the relay APR which was deenergized and energized by an obvious circuit including contact 37 which is actuated in accordance with the operation of lever of the Addressograph data recorder. Thus, it can be seen that operation of the Addressograph data recorder deactivates the cashier's time recorder, adds one unit to the total vehicle counter in response to a leaving vehicle and adds one unit to the count displayed by the periodic vehicle counter.

Should the cashier try to operate the Addressograph data recorder more than one time in response to an exiting vehicle or when no vehicle is present the additional operations will be reported on the illustrated "extra" periodic counter in accordance with the energization of the add coil of the "extra" periodic counter over back contact 34 of relay OPR and back contact 39 of the relay APR as caused by the opening and closing of contact 37 each time the recorder is operated. Similarly, if the cashier uses the Addressograph data recorder after stamping the exit time using the regular cashier's time recorder, these subsequent operations of the Addressograph recorder will be counted on the extra periodic counter.

Should the operator of a vehicle attempt to leave the detection zone adjacent the cashier's booth prior to the time the cashier stamps his parking ticket either in the regular time recorder or the Addressograph data recorder, a suitable warning is again provided the cashier, when back contact 32 of relay OR closes in response to the vehicle leaving detection zone. Energy for this alarm circuit is provided, of course, by means of the closed front contact 34 of the relay OPR.

Figure 7:
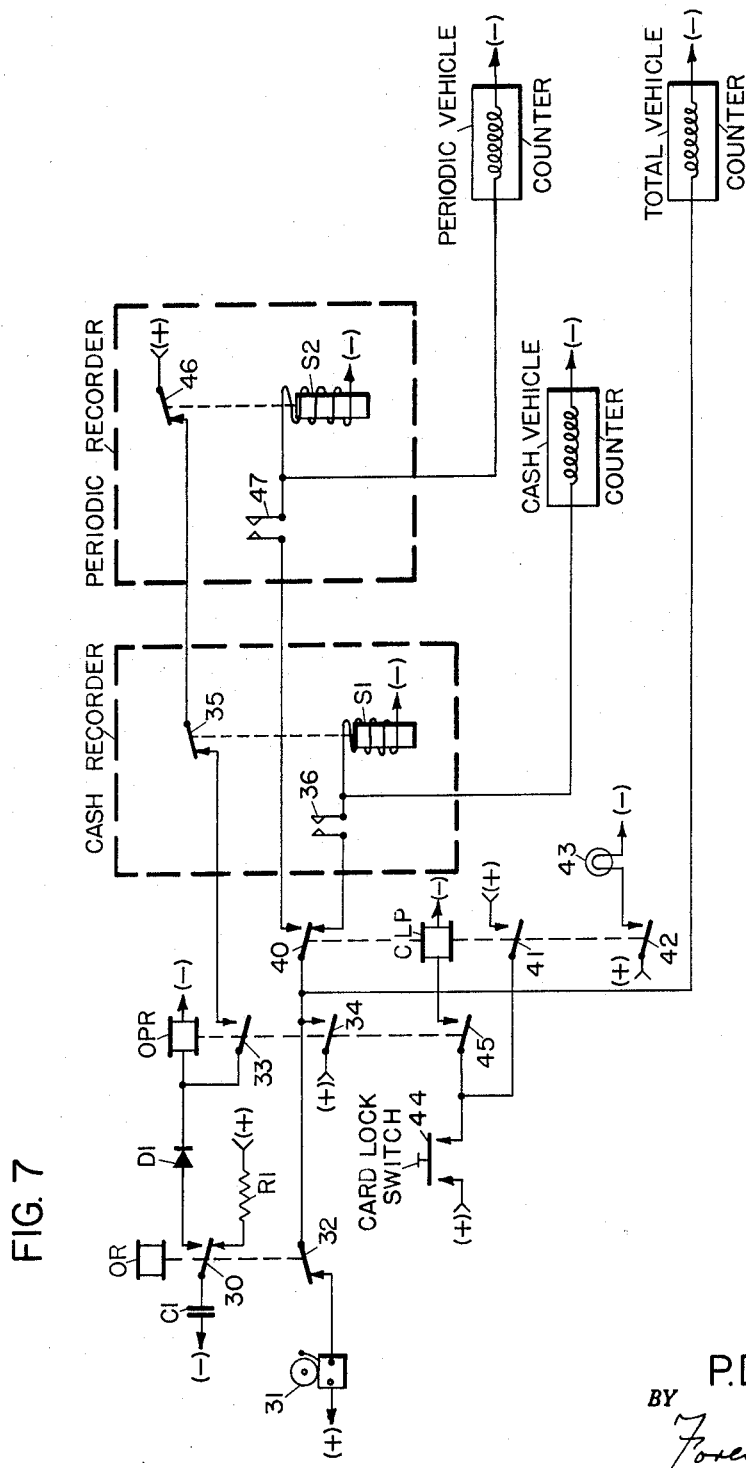
FIG. 7 illustrates the circuit arrangement of a third form of this embodiment of the present invention which may be utilized when the parking fees are payable with cash or charged to a periodic account and in which the periodically charged customers themselves condition the appropriate cashiering apparatus for operation.

FIG. 7 illustrates a third form of the present invention utilizing a card lock unit installed just prior to the collection station. With this circuit arrangement, it is proposed that the presence of a vehicle beneath the ultrasonic detector will cause the energization of the occupancy relay OR in the usual manner. Energization of the relay OR will, in turn, close its front contact 30 thereby causing the charge previously developed on the capacitor C1 through an obvious circuit including resistor R1, to discharge through the diode D1 and the windings of the relay OPR to (—).

The relay OPR will thereafter be maintained in its energized condition by means of a stick circuit which includes (+) normally closed contact 46, normally closed contact 35, front contact 33 of relay OPR and (—). Energization of the relay OPR closes its front contact 34 providing an energizing source for the time recorder used with cash customers.

If the operator of the vehicle is a cash customer, the insertion of the parking ticket into the cash time recorder will close the contacts of ticket switch 36 thereby providing an energizing circuit for the stamping solenoid S1 in the cash time recorder. This circuit includes (+), front contact 34 of relay OPR, back contact 40 of relay CLP, ticket switch 36, the windings of the solenoid S1 and (—). Energization of the solenoid will actuate the stamping anvil and will in the usual manner cause the time recorder to print the exit time on the cash customer's ticket.

Energization of the stamping solenoid S1 also opens its associated contact 35, open circuiting the positive source of potential being applied to the windings of the relay OPR through back contact 46 of the solenoid S2 which is located in the periodic time recorder. One unit is added to the total vehicle counter and one unit is also added to the cash vehicle counter in accordance with the energization and deenergization of the relay OPR which closes and thereafter opens its contact 34 in a manner previously discussed.

If the operator of the vehicle was a periodically charged customer, he would drive beneath the ultrasonic detector and condition the cashier's cash customer time recorder in the same manner as mentioned above. However, in accordance with this form of the present invention, it is anticipated that a card lock unit is installed just prior to the collection booth and so situated that it is within easy reach of the operator of the vehicle, upon first occupying the detector area. Under these circumstances, a periodic paying customer would stop, insert a coded card key into the car locking unit until he observes a green light indicating he may now proceed to the collection station.

The periodic paying customer then gives the cashier his parking ticket which was issued him on entering the parking area and the cashier inserts this ticket in the cashier's periodic time recorder for stamping of the exit time thereon and the monthly customer leaves the parking area.

The circuit operation is as follows:

With the exiting vehicle in the detection zone, the relay OPR will become energized as previously described closing its front contact 45. When the periodic paying customer inserts his coded card key in the card lock unit, a circuit is completed for energizing the relay CLP. This circuit includes (+), card lock switch 44 which is now closed, front contact 45 of relay OPR, the windings of the relay CLP and (—). When the coded card key is removed, energy is maintained on the windings of the relay CLP by means of a stick circuit including (+), front contact 41 of relay CLP, front contact 45 of relay OPR, the windings of relay CLP and (—).

Energization of the relay CLP closes its front contact 40 which conditions the cashier's periodic time recorder for operation and closes its front contact 42 which energizes the light 43 to instruct the driver that he should now proceed to the collection point. When the cashier subsequently inserts the periodic paying customer's ticket into the periodic time recorder, the contacts of the ticket switch 47 close completing a circuit for energizing the printing solenoid S2. This circuit includes (+), front contact 34 of relay OPR, front contact 40 of relay CLP, closed ticket switch 47, the windings of the solenoid S2 and (—). Closure of the contacts of the ticket 47 by insertion of the parking ticket into the monthly time recorder, also completes a circuit which places energy on the added coil of the periodic vehicle counter and when the parking ticket is removed from the periodic time recorder after the stamping operation, a count will be added to the periodic vehicle counter.

Energization of the soelnoid S2 to perform the stamping operation, opens back contact 46 thereby removing stick energy from the windings of relay OPR. This opens front contact 34 of relay OPR which, in turn, removes energy from the total vehicle counter coil thereby adding one unit to the display means thereof in accordance with the exiting vehicle.

The opening of front contact 45 of deenergized relay OPR removes energy from the windings of relay CLP causing this relay to close its back contact 40 thereby conditioning the circuit for operation of the cash time recorder. The opening of front contact 42 of the relay CLP removes energy from the light indicator restoring the circuit to its normal condition as shown in FIG. 7.

Thus, it can be seen that in this third form of the present invention, the sum displayed by the total vehicle counter should be equal to the sum of the counts appearing on the cash vehicle counter and the periodic vehicle counter. Additionally, operation of the exit time clocks can only be effected when a vehicle is detected adjacent the cashier's collection station and the cash time recorder or the periodic time recorder may be employed by the cashier one time. It can also be seen that the periodic recorder may be utilized only in conjunction with operation of the card lock unit by the periodic paying customer with a properly identified card key.

It should also be noted that one of the printing wheels of the exit time recorders discussed herein may be provided with an identifying symbol or numeral. Under these circumstances, by employing different identification symbols for each time recorder, when the cashier accounts he must have the correct number of cash tickets properly validated with the date and exit time and correct number of periodically paid tickets properly validated with date and time of exiting. These tickets must tally with the totals appearing on the counters.

Having thus described three forms of the present invention, as applied to a cashiering system for a parking area, it is to be understood that this form of the disclosures has been presented as a means of illustrating the principles and mode of operation of the various parts of the system rather than to limit the number of forms that the present invention may assume. Thus, it should be obvious that the control system of the present invention is equally applicable for controlling the cashiering operations wherever it is desirable that the cashiering apparatus be operated only when a vehicle is present, for example, at a highway toll collection station or the like. It is to be further understood that various adaptations, alterations, and modifications may be applied to the specific form shown and still be within the spirit and scope of the present invention except as limited by the appended claims.

What I claim is:

1. A cashier surveillance system for a parking area wherein a parking fee is charged to an exiting vehicle in accordance with the elapsed time recorded on a parking ticket issued previously for said vehicle upon its entering said parking area, comprising,
    (a) detection means for providing an output signal in response to the presence of an exiting vehicle,
    (b) recording means operable only in response to said output signal for stamping an exit time record on the parking ticket for said exiting vehicle,
    (c) and recorder control means for rendering said recording means inoperative after said recording means has been once operated to stamp the parking ticket for said exiting vehicle.

2. A system in accordance with claim 1 having alarm means actuated in response to the presence and thereafter the absence of said output signal prior to operation of said recording means as would occur if a vehicle attempts to exit from said parking area without payment of said parking fee.

3. A cashier surveillance system for a parking area wherein a parking fee is collected from a leaving vehicle in accordance with the elapsed time recorded on a parking ticket issued previously for said vehicle upon its entering said parking area comprising,
    (a) detection means for providing an output signal in response to the presence of a leaving vehicle,
    (b) recording means operable only in response to said output signal for stamping an exit time record on the parking ticket for said exiting vehicle,
    (c) a first counting means operable in response to said output signals for providing a count of the total number of exiting vehicles,
    (d) a second counting means operable in response to actuation of said recording means for providing a count of the total number of stamping operations,
    (e) recorder control means for rendering said recording means inoperative after said recording means has been once operated to stamp the parking ticket for each exiting vehicle,
    (f) and alarm means for providing a suitable warning in response to the presence and thereafter the absence of said output signal prior to operation of said recording means as would occur if a vehicle attempts to exit from said parking area without payment of said parking fee.

4. A cashier surveillance system for a parking area having means for issuing a time stamped parking ticket to the operator of an entering vehicle comprising,
    (a) detection means for providing an energizing source in response to an exiting vehicle,
    (b) recording means including a printing solenoid effective when energized to stamp the exit time on said parking ticket,
    (c) a switch effective whenever a parking ticket is inserted in said recording means for operatively connecting electrically said printing solenoid to said energizing source of said detection means,
    (d) circuit means operable in response to energization of said solenoid for thereafter disconnecting said energizing source from said solenoid,
    (e) and warning means responsive to said detection means and said recording means for providing a suitable warning to said cashier of the presence and thereafter the absence of said vehicle prior to operation of said recording means.

5. A system in accordance with claim 4 including a first counting means responsive to said energizing source of said detection means for adding a count in response to each exiting vehicle and second counting means responsive to the energization of said solenoid for adding a count in response to each operation of said recording means.

6. A cashier surveillance system for a parking area wherein a parking fee payable in accordance with the elapsed time recorded on a parking ticket is paid in cash or in accordance with a periodic account comprising,
    (a) detection means for providing a first output signal in response to the presence of a vehicle,
    (b) first time recording means operable in response to said first output signal for stamping an exit time record on said parking ticket,
    (c) means actuated in response to an identification token inserted by said periodic paying customer for providing a second output signal,
    (d) second time recording means operable in response to said first and second output signals for stamping an exit time record on said parking ticket,
    (e) and circuit means responsive to said first or second operated time recording means for thereafter rendering said first and second time recording means inoperative until another vehicle is detected by said detection means.

7. A cashier surveillance system for a parking area in accordance with claim 6 having alarm means actuated in response to the presence and thereafter the absence of said first output signal prior to operation of one of said first and second time recording means.

8. A cashier surveillance system for a parking area in accordance with claim 7 wherein means are provided for rendering said alarm means inoperative after operation of one of said first and second time recording means.

9. A cashier surveillance system for a parking area in which a fee is paid in cash or in accordance with a periodic account comprising,
    (a) a first time recorder including a solenoid for recording the time on a parking ticket in response to energization of said solenoid,
    (b) a second time recorder including a solenoid for recording the time on a parking ticket in response to energization of said solenoid,
    (c) detection means for providing a first energizing source in response to the presence of a vehicle, said first energizing source normally connected electrically to said first time recording means for energizing said solenoid upon insertion of a parking ticket therein,
    (d) means actuated in response to an identification token inserted therein for providing a second energizing source,
    (e) control means responsive to said second energizing source for operatively connecting electrically said second time recorder to said first energizing means for energizing said solenoid upon insertion of a parking ticket therein, (f) and circuit means responsive to the first energized of said solenoids for disconnecting said first energizing source whereby a selected first or second time recorder may be operated one time in accordance with the detection of a vehicle.

10. A cashier surveillance system for a parking area in accordance with claim 9 having alarm means responsive to said first energizing source in accordance with the detection of the presence and thereafter the absence of a vehicle prior to energization of one of said solenoids.

11. A cashier surveillance system for a parking area in which a fee is paid in cash or in accordance with a periodic account comprising, (a) detection means for providing an energizing source in response to the presence of a vehicle, (b) a first time recorder including a solenoid for printing the exit time on a parking ticket, (c) a second recording means, (d) means responsive to the insertion of a parking ticket into said first time recorder for operatively connecting electrically said energizing source to said solenoid, (e) and circuit means actuated in response to said first actuated of said first and second recording means for disconnecting said energizing source of said detection means.

12. In a system for controlling apparatus adapted to be initiated into operation manually when a vehicle is present at a predetermined location along a right of way, the combination of (a) detecting means effective to detect the presence of a vehicle at said predetermined location, (b) manually operable means, (c) control means effective to initiate operation of said apparatus in response to the actuation of said manually operable means only if said actuation occurs contemporaneously with the detection of a vehicle at said location by said vehicle detecting means, and (d) means responsive to said vehicle detecting means and said manually operable means effective to prevent more than a single operation of said apparatus while said vehicle is present at said location.

13. In a system for controlling apparatus adapted to be initiated into operation manually when a vehicle is present at a predetermined location along a right of way, the combination of, (a) detecting means effective to detect whether or not a vhicle is present at said predetermined location, (b) storage means operable to an actuated condition in response to only a momentary energization upon the detection of a vehicle by said detecting means, (c) manually operable means on the wayside, and (d) control means effective to initate operation of said apparatus in response to the actuation of said manually operable means only when said actuation occurs with said storage means in its said actuated condition, and such actuation of said manually operable means also effective to reset said storage means to its normal non-actuated condition.

14. In a system for controlling electrically operated apparatus adapted to be initiated into operation manually when a vehicle is present at a predetermined location along a right of way, the combination of, (a) vehicle detection means for detecting whether or not a vehicle is present at said predetermined location, (b) manually operable means, and (c) energizing circuit means effective when fully completed to initiate the operation of said electrically operated apparatus and including first and second normally open contact means connected in series, said first contact means being closed to partially complete said energizing circuit means when a vehicle is detected at said location by said detection means and said second contact means being closed to fully complete said energizing circuit means upon actuation of said manually operable means, means effective to deenergize said circuit means after said electrical apparatus has once been operated for a given vehicle so as to prevent more than a single operation of said electrical apparatus for each vehicle detected at said predetermined location, whereby the operation of said electrical apparatus can only be initiated if the actuation of said manually operable means occurs following the detection of the presence of a vehicle at said location.

15. In a system for supervising an attendant employed at a predetermined location adjacent a vehicle traffic lane to perform a predetermined duty relative to each vehicle as it passes adjacent thereto, the combination of, (a) apparatus required to be operated by said attendant as each vehicle passes adjacent said location in order to perform said predetermined duty, (b) means for detecting whether or not a vehicle is passing adjacent said location, (c) control means responsive to said detection means effective to permit operation of said apparatus by said attendant, and (d) means responsive to the operating condition of said aparatus and said detecting means effective to prevent more than a single operation of said apparatus for each vehicle detected by said detecting means.

16. In a system for monitoring the operations at a cashiering location at which vehicles are required to pay predetermined fees when passing thereby, said fees being payable either in cash or by charge account, the combination of, (a) detection means for detecting the presence of a vehicle at said cashiering location, (b) first recorder means effective when operated to record the payment of said predetermined fees by charge account, (c) second recorder means effective when operated to record the cash payment of said predetermined fees, (d) recorder selecting means for selectively rendering one or the other of said first or second recording means effective to record payment, by a given vehicle, of said predetermined fees dependent respectively upon whether or not said given vehicle has a charge account, (e) recorder control means responsive to said detecting means and said recorder selecting means for permitting the selected one of said first or second recorder means to be operated by an attendant at said cashiering location, and (f) means responsive to the operation of either of said first or said second recorder means when recording payment of said fees for a given vehicle, to thereafter render said first and second recorder means inoperative until a subsequent vehicle is detected.

References Cited by the Examiner
UNITED STATES PATENTS

| | | | |
|---|---|---|---|
| 2,540,911 | 2/1951 | Rembusch et al. | 347—14 |
| 2,741,433 | 4/1956 | Cooper | 235—92 |
| 2,947,591 | 8/1960 | Henry et al. | 346—50 |
| 3,057,422 | 10/1962 | Cunningham et al. | 177—210 |
| 3,081,941 | 3/1963 | Hilliker | 235—99.1 |

LEYLAND M. MARTIN, *Primary Examiner.*

MALCOLM A. MORRISON, *Examiner.*